(12) United States Patent
Kim et al.

(10) Patent No.: US 11,867,845 B2
(45) Date of Patent: Jan. 9, 2024

(54) LIDAR APPARATUS FOR VEHICLE AND CONTROL METHOD THEREOF

(71) Applicant: HYUNDAI MOBIS CO., LTD., Seoul (KR)

(72) Inventors: Young Shin Kim, Yongin-si (KR); Won Gyum Kim, Yongin-si (KR); Kyung Rin Kim, Yongin-si (KR); Sung Eun Jo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 1061 days.

(21) Appl. No.: 16/412,312

(22) Filed: May 14, 2019

(65) Prior Publication Data

US 2019/0353762 A1 Nov. 21, 2019

(30) Foreign Application Priority Data

May 15, 2018 (KR) ........................ 10-2018-0055217

(51) Int. Cl.
 *G01S 7/497* (2006.01)
 *G01S 7/481* (2006.01)
 *G01S 17/931* (2020.01)
(52) U.S. Cl.
 CPC ............ *G01S 7/497* (2013.01); *G01S 7/4813* (2013.01); *G01S 7/4814* (2013.01);
 (Continued)
(58) Field of Classification Search
 CPC ...... G01S 7/497; G01S 7/4813; G01S 7/4814; G01S 7/4817; G01S 17/931; G01S 2007/4977
 See application file for complete search history.

(56) References Cited

U.S. PATENT DOCUMENTS 9,784,840 B2 10/2017 Pedersen et al.
10,338,225 B2 * 7/2019 Boehmke .............. G01S 17/931
(Continued)

FOREIGN PATENT DOCUMENTS

EP          3287810       2/2018
KR  10-2012-0028540    3/2012
(Continued)

OTHER PUBLICATIONS

Korean Office Action dated Oct. 21, 2021, issued to Korean Patent Application No. 10-2018-0055217.
(Continued)

*Primary Examiner* — Aniss Chad
*Assistant Examiner* — Christine Nguyen Huynh
(74) *Attorney, Agent, or Firm* — H.C. Park & Associates, PLC

(57) ABSTRACT

A LIDAR (Light Detection and Ranging) apparatus for a vehicle including a light emitting unit configured to emit laser light; an angle adjusting unit configured to adjust an emission angle of the laser light emitted from the light emitting unit by reflecting the laser light; a window cover unit installed to discharge the laser light emitted through the angle adjusting unit to the outside of the vehicle; a light receiving unit configured to receive reflected light introduced into the vehicle through the window cover unit; and a moisture removing unit configured to emit far-infrared light using a far-infrared light source to heat the window cover unit through the angle adjusting unit.

5 Claims, 4 Drawing Sheets

(52) U.S. Cl.
CPC .......... *G01S 7/4817* (2013.01); *G01S 17/931* (2020.01); *G01S 2007/4977* (2013.01)

(56) References Cited

U.S. PATENT DOCUMENTS

| | | | |
|---|---|---|---|
| 10,351,103 B2 * | 7/2019 | Yeo | ........................ G01S 7/4813 |
| 2017/0168146 A1 | 6/2017 | Boehmke | |
| 2018/0284226 A1 * | 10/2018 | LaChapelle | .............. G01S 7/003 |
| 2018/0292515 A1 * | 10/2018 | Paxton | ................. G01S 7/4815 |

FOREIGN PATENT DOCUMENTS

| | | | | |
|---|---|---|---|---|
| KR | 20120028540 A | * | 3/2012 | ................ B60S 1/02 |
| KR | 10-2015-0009177 | | 1/2015 | |
| KR | 10-2017-0078031 | | 7/2017 | |
| WO | 2013139347 | | 9/2013 | |

OTHER PUBLICATIONS

Office Action dated Nov. 4, 2022, issued to Chinese Patent Application No. 201910397315.7.

\* cited by examiner

LIDAR APPARATUS FOR VEHICLE AND CONTROL METHOD THEREOF

CROSS-REFERENCES TO RELATED APPLICATION

This application claims priority from and the benefit of Korean Patent Application No. 10-2018-0055217, filed on May 15, 2018, which is hereby incorporated by reference for all purposes as if fully set forth herein.

BACKGROUND

Field

Exemplary embodiments relate to a LIDAR (Light Detection and Ranging) apparatus and a control method thereof, and more particularly, to a LIDAR apparatus which includes a moisture removing unit using a far-infrared light source to effectively remove moisture of a window cover and can increase emission and reception efficiency of light, and a control method thereof.

Discussion of the Background

Recently, as vehicles become highly intelligent, research is actively performed on the ADAS (Advanced Driver Assistance System) and the autonomous vehicle.

In order to implement the ADAS and the autonomous vehicle, various sensors are necessarily required. Such sensors include a radar, a LIDAR, a camera and the like.

In particular, the LIDAR has an advantage in that the LIDAR can obtain correct distance information even though its object detection accuracy is slightly low. Thus, most autonomous vehicles have a LIDAR apparatus mounted at the front and rear thereof.

The LIDAR apparatus mounted on a vehicle includes a light emitting unit, a light receiving unit and a driving unit, which are installed in a housing. The housing has a transparent window cover through which light can enter and exit.

In the conventional LIDAR apparatus, a moisture removing unit using a hot wire is installed in the window cover in order to remove moisture. However, since a predetermined region of the window cover is covered by the hot wire, the light emission efficiency and the light receiving efficiency of the LIDAR apparatus may be degraded.

The related art of the present invention is disclosed in Korean Patent Publication No. 10-2015-0009177, published on Jan. 26, 2015 and entitled "LIDAR Sensor System".

The above information disclosed in this Background section is only for enhancement of understanding of the background of the invention and, therefore, it may contain information that does not constitute prior art.

SUMMARY

Exemplary embodiments of the present invention provide a LIDAR apparatus which includes a moisture removing unit using a far-infrared light source to effectively remove moisture of a window cover and can increase emission and reception efficiency of light, and a control method thereof.

In one embodiment, a LIDAR apparatus for a vehicle may include: a light emitting unit configured to emit laser light; an angle adjusting unit configured to adjust an emission angle of the laser light emitted from the light emitting unit by reflecting the laser light; a window cover unit installed to discharge the laser light emitted through the angle adjusting unit to the outside of the vehicle; a light receiving unit configured to receive reflected light introduced into the vehicle through the window cover unit; and a moisture removing unit configured to emit far-infrared light using a far-infrared light source to heat the window cover unit through the angle adjusting unit.

The angle adjusting unit may include: a horizontal rotating body configured to rotate in a horizontal direction to adjust a horizontal emission angle of the laser light or the far-infrared light; and a reflecting mirror installed in the horizontal rotating body, and configured to rotate in a vertical direction to adjust a vertical emission angle of the laser light or the far-infrared light.

The LIDAR apparatus may further include: a sensor unit configured to sense a state of the window cover unit; and a control unit configured to control one or more of the angle of the angle adjusting unit and the intensity of the far-infrared light source of the moisture removing unit, depending on the state of the window cover unit, sensed by the sensor unit.

When it is determined that moisture is formed on an entire region of the window cover unit and it is determined that rain or snow is falling, the control unit may transmit a control signal to the moisture removing unit and the angle adjusting unit to heat the entire region of the window cover unit using the far-infrared light source equal to or more than a first setting value.

When it is determined that moisture is formed on an entire region of the window cover unit and it is determined that rain or snow is not falling, the control unit may transmit a control signal to the moisture removing unit and the angle adjusting unit to heat the entire region of the window cover unit using the far-infrared light source equal to or less than a second setting value.

When it is determined that moisture is formed on a specific region of the window cover unit, the control unit may transmit a control signal to the moisture removing unit and the angle adjusting unit to heat only the specific region of the window cover unit using the far-infrared light source equal to or more than a third setting value.

The moisture removing unit may include: a body including the far-infrared light source; and a condensing lens configured to condense the far-infrared light emitted from the far-infrared light source.

The window cover unit may include a transparent window cover.

In another embodiment, a control method of a LIDAR apparatus for a vehicle may include: sensing a state of a window cover unit; determining whether moisture is formed on an entire region of the window cover unit; and determining whether rain or snow is falling, wherein the determining of whether rain or snow is falling is performed when the determination result of the determining of whether moisture is formed on the entire region of the window cover unit indicates that moisture is formed on the entire region of the window cover unit.

When the determination result of the determining of whether rain or snow is falling indicates that rain or snow is falling, a control unit may perform heating the entire region of the window cover unit using a far-infrared light source equal to or more than a first setting value.

When the determination result of the determining of whether rain or snow is falling indicates that rain or snow is not falling, a control unit may perform heating the entire region of the window cover unit using a far-infrared light source equal to or less than a second setting value.

When the determination result of the determining of whether moisture is formed on the entire region of the window cover unit indicates that moisture is no formed on the entire region of the window cover unit, a control unit may perform determining whether moisture is formed only on a specific region of the window cover.

When the determination result of the determining of whether moisture is formed on the specific region of the window cover unit indicates that moisture is formed on the specific region of the window cover unit, the control unit may perform heating only the specific region of the window cover unit using a far-infrared light source equal to or more than a third setting value.

In accordance with the embodiments of the present invention, the LIDAR apparatus and the control method thereof may include the moisture removing unit using the far-infrared light source to effectively remove moisture of the window cover, and raise the emission and reception efficiency of light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
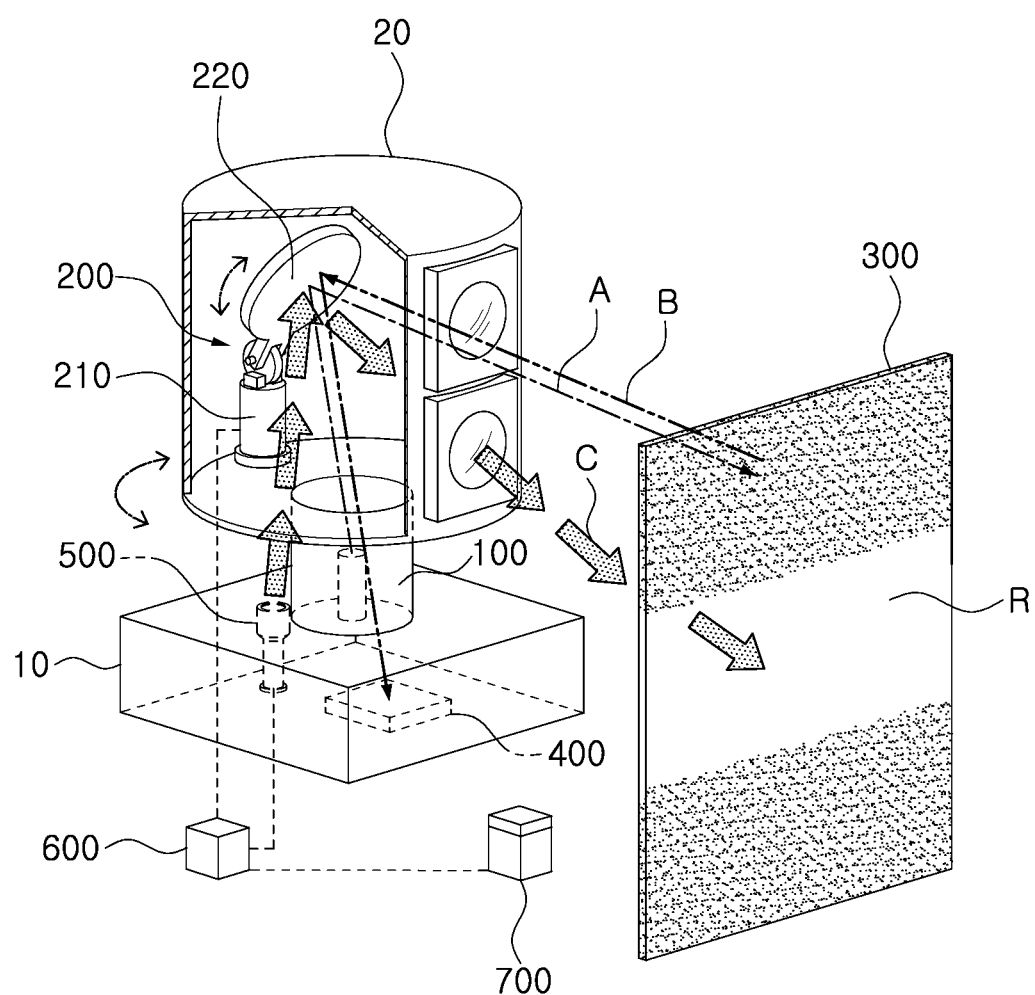
FIG. 1 illustrates a LIDAR apparatus for a vehicle in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereafter, a LIDAR (Light Detection and Ranging) apparatus and a control method thereof in accordance with embodiments of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
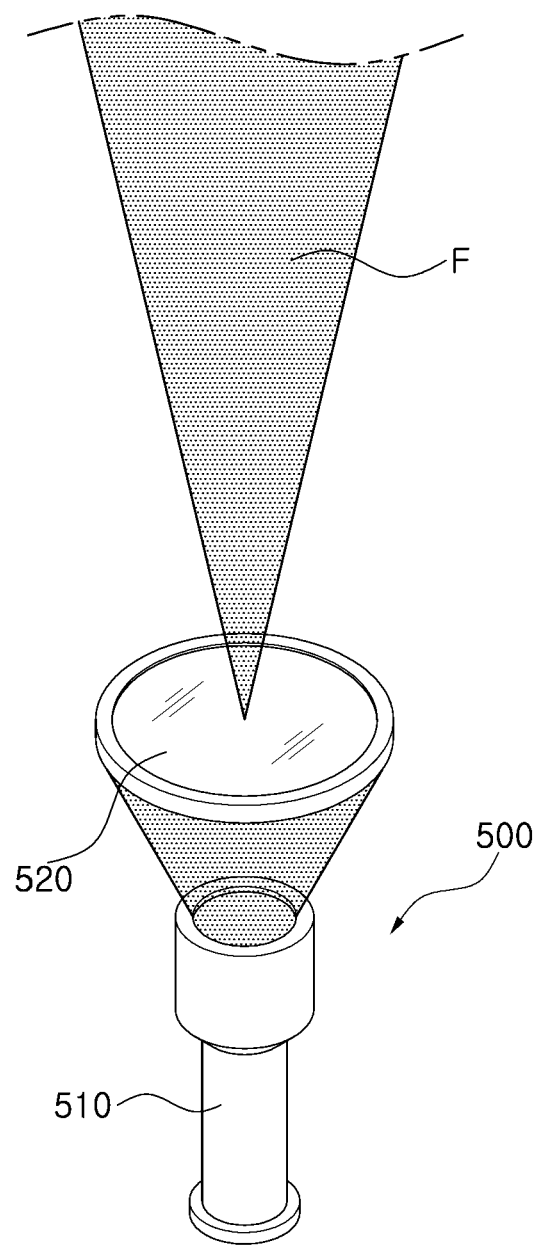
FIG. 2 illustrates a moisture removing unit applied to the LIDAR apparatus for a vehicle in accordance with the embodiment of the present invention.
Figure 3:
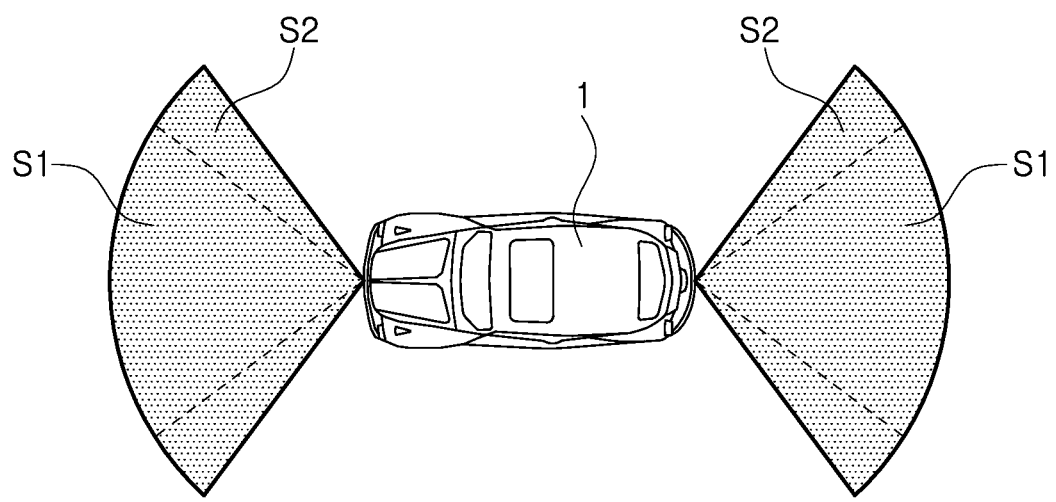
FIG. 3 illustrates a sensing range of a vehicle on which the LIDAR apparatus for a vehicle in accordance with the embodiment of the present invention is mounted.
Figure 4:
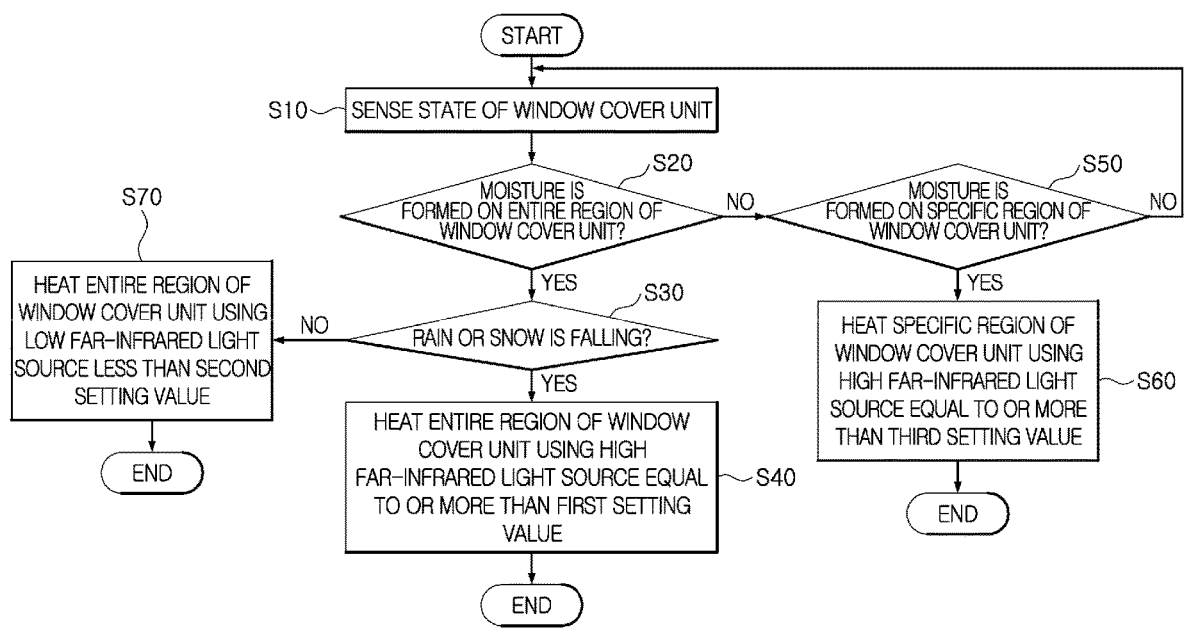
FIG. 4 is a control flowchart illustrating operations of the moisture removing unit and an angle adjusting unit which are applied to the LIDAR apparatus for a vehicle in accordance with the embodiment of the present invention.

FIG. 1 illustrates a LIDAR apparatus for a vehicle in accordance with an embodiment of the present invention, FIG. 2 illustrates a moisture removing unit applied to the LIDAR apparatus for a vehicle in accordance with the embodiment of the present invention, FIG. 3 illustrates a sensing range of a vehicle on which the LIDAR apparatus for a vehicle in accordance with the embodiment of the present invention is mounted, and FIG. 4 is a control flowchart illustrating operations of the moisture removing unit and an angle adjusting unit which are applied to the LIDAR apparatus for a vehicle in accordance with the embodiment of the present invention.

Referring to FIGS. 1 to 4, the LIDAR apparatus for a vehicle in accordance with the embodiment of the present invention may be installed at the front and rear of a vehicle, emit laser light onto a target around the vehicle to recognize the target, and receive light reflected from the target to calculate information of the target, the information including a distance, direction, speed, material and the like.

The LIDAR apparatus for a vehicle in accordance with the embodiment of the present invention may include a light emitting unit 100, an angle adjusting unit 200, a window cover unit 300, a light receiving unit 400 and a moisture removing unit 500.

The light emitting unit 100 may be installed in a main housing (not illustrated), and configured to emit laser light using a laser light source.

The angle adjusting unit 200 may be installed in a second housing 20 positioned in the main housing, and configured to adjust an emission angle of laser light A emitted from the light emitting unit 100 by reflecting the laser light A.

Furthermore, the angle adjusting unit 200 may adjust an emission angle of far-infrared light C emitted from the moisture removing unit 500 by reflecting the far-infrared light C.

The window cover unit 300 may be installed in the main housing, and include a window cover R which is formed of a transparent material such as plastics or tempered glass, such that laser light emitted through the angle adjusting unit 200 can be discharged to the outside of the vehicle 1, and light B reflected from a target (not illustrated) positioned around the vehicle 1 can be introduced into the vehicle 1.

The light receiving unit 400 may be installed in the first housing 10 positioned in the main housing, and configured to receive the reflected light B introduced into the vehicle 1 through the window cover unit 300.

The moisture removing unit 500 may include a far-infrared light source, and emit far-infrared light using the far-infrared light source to heat the window cover unit 300 through the angle adjusting unit 200, thereby removing moisture which may be formed on the window cover unit 300 by rain or snow.

The moisture removing unit 500 may include a body 510 having the far-infrared light source installed therein and a condensing lens 520 configured to condense the far-infrared light C to be emitted onto a predetermined region F.

The condensing lens 520 may be replaced with a suitable lens depending on the structure and type of the LIDAR apparatus, and a moisture removal region for the window cover unit 300 may be adjusted through the replacement of the condensing lens 520.

The angle adjusting unit 200 may include a horizontal rotating body 210 and a reflecting mirror 220. The horizontal rotating body 210 may rotate in the horizontal direction to adjust the horizontal emission angle of the laser light A or the far-infrared light C, and the reflecting mirror 220 may be installed in the horizontal rotating body 210, and rotate in the vertical direction to adjust the vertical emission angle of the laser light A or the far-infrared light C.

The LIDAR apparatus for a vehicle in accordance with the embodiment of the present invention may further include a control unit 600 and a sensor unit 700.

The sensor unit 700 may sense a state of the window cover R of the window cover unit 300. That is, the sensor unit 700 may be configured to sense whether moisture is formed on the entire region of the window cover R, formed on a specific region of the window cover R, or not formed on the window cover R. The sensor unit 700 may be configured to sense whether rain or snow is falling, and include a plurality of sensors having various functions.

The control unit 600 may adjust the angle of the angle adjusting unit 200 or the intensity of the far-infrared light source of the moisture removing unit 500, depending on the state of the window cover unit 300, sensed by the sensor unit 700. That is, the control unit 600 may adjust only the angle of the angle adjusting unit 200, adjust only the intensity of the far-infrared light source of the moisture removing unit 500, or adjust both of the angle of the angle adjusting unit 200 and the intensity of the far-infrared light source of the moisture removing unit 500, depending on the state of the window cover unit 300, sensed by the sensor unit 700.

Hereafter, a method for controlling the moisture removing unit 500 and the angle adjusting unit 200 which are applied to the LIDAR apparatus for a vehicle in accordance with the embodiment of the present invention will be described with reference to FIG. 4.

The sensor unit 700 may sense a state of the window cover R at step S10. The control unit 600 may determine whether moisture is formed on the entire region of the window cover R, based on the information sensed by the sensor unit 700, at step S20.

When it is determined that moisture is formed on the entire region of the window cover R, the control unit 600 may determine whether rain or snow is falling, based on the information sensed by the sensor unit 700, at step S30.

When it is determined that rain or snow is falling, the control unit 600 may transmit a control signal to the moisture removing unit 500 to heat the entire region of the window cover R using a high far-infrared light source equal to or more than a first setting value, at step S40. At this time, the control unit 600 may also transmit the control signal to the angle adjusting unit 200 when the angle of the angle adjusting unit 200 needs to be changed.

When it is determined that moisture is formed on the entire region of the window cover R but it is determined that rain or snow is not falling, the control unit 600 may transmit the control signal to the moisture removing unit 500 to heat the entire region of the window cover R using a low far-infrared light source less than a second setting value, step S70. At this time, the control unit 600 may also transmit the control signal to the angle adjusting unit 200 when the angle of the angle adjusting unit 200 needs to be changed.

When it is determined that moisture is not formed on the entire region of the window cover R, the control unit 600 may determine whether moisture is formed on a specific region of the window cover R, at step S50.

When it is determined that moisture is formed only on the specific region of the window cover R, the control unit 600 may transmit the control signal to the moisture removing unit 500 to heat only the specific region of the window cover R using a high far-infrared light source equal to or more than a third setting value, at step S60. At this time, the control unit 600 may also transmit the control signal to the angle adjusting unit 200 when the angle of the angle adjusting unit 200 needs to be changed.

When the LIDAR apparatus for a vehicle in accordance with the embodiment of the present invention is mounted at the front and rear of the vehicle 1 as illustrated in FIG. 3, moisture of the window cover can be effectively removed, and a predetermined region of the window cover may not be covered by a hot wire, which makes it possible to improve the emission and reception efficiency of light while securing a winder sensing region S2 than a sensing region S1 in the related art.

As described above, the LIDAR apparatus in accordance with the embodiment of the present invention may include the moisture removing unit using the far-infrared light source to effectively remove moisture of the window cover, and raise the emission and reception efficiency of light.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A LIDAR (Light Detection and Ranging) apparatus for a vehicle, comprising:
   a light emitter configured to emit laser light;
   an angle adjuster configured to adjust an emission angle of the laser light emitted from the light emitter by reflecting the laser light;
   a window cover installed to discharge the laser light emitted through the angle adjuster to the outside of the vehicle;
   a light receiver configured to receive reflected light introduced into the vehicle through the window cover;
   a moisture remover configured to emit far-infrared light using a far-infrared light source to heat the window cover through the angle adjuster;
   a sensor configured to sense:
     whether moisture has formed on the window cover; and
     whether rain or snow is falling; and
   a controller configured to control one or more of the angle of the angle adjuster and the intensity of the far-infrared light source of the moisture remover, depending on whether moisture has formed on the window cover, sensed by the sensor,
   wherein:
   the moisture remover comprises a condensing lens configured to condense the far-infrared light emitted from the far-infrared light source and transmit the far-infrared light to an angle adjusting unit;
   when it is determined that moisture is formed on an entire region of the window cover and it is determined that rain or snow is falling, the controller transmits a control signal to the moisture remover and the angle adjuster to heat the entire region of the window cover to a value equal to or greater than a first setting value using the far-infrared light source;

when it is determined that moisture is formed on an entire region of the window cover and it is determined that rain or snow is not falling, the controller transmits a control signal to the moisture remover and the angle adjuster to heat the entire region of the window cover to a value equal to or less than a second setting value using the far-infrared light source; and when it is determined that moisture is formed on a specific region of the window cover, the controller transmits a control signal to the moisture remover and the angle adjuster to heat only the specific region of the window cover to a value equal to or greater than a third setting value using the far-infrared light source.

2. The LIDAR apparatus of claim 1, wherein the angle adjuster comprises:

a horizontal rotating body configured to rotate in a horizontal direction to adjust a horizontal emission angle of the laser light or the far-infrared light; and a reflecting mirror installed in the horizontal rotating body, and configured to rotate in a vertical direction to adjust a vertical emission angle of the laser light or the far-infrared light.

3. The LIDAR apparatus of claim 1, wherein the moisture remover further comprises a body comprising the far-infrared light source.

4. The LIDAR apparatus of claim 1, wherein the window cover comprises a transparent window cover.

5. A method of controlling a LIDAR (Light Detection and Ranging) apparatus for a vehicle, comprising:

sensing whether moisture has formed on a window cover;

determining, by a sensor mounted on the vehicle, whether moisture is formed on an entire region of the window cover; and determining, by a sensor mounted on the vehicle, whether rain or snow is falling, wherein:

the determining of whether rain or snow is falling is performed when the determination result of the determining of whether moisture is formed on the entire region of the window cover indicates that moisture is formed on the entire region of the window cover;

when the determination result of the determining of whether rain or snow is falling indicates that rain or snow is falling, a controller performs heating the entire region of the window cover to a value equal to or greater than a first setting value using a far-infrared light source;

when the determination result of the determining of whether rain or snow is falling indicates that rain or snow is not falling, a controller performs heating the entire region of the window cover to a value equal to or less than a second setting value using a far-infrared light source;

when the determination result of the determining of whether moisture is formed on the entire region of the window cover indicates that moisture is not formed on the entire region of the window cover, a controller performs determining whether moisture is formed only on a specific region of the window cover; and when the determination result of the determining of whether moisture is formed on the specific region of the window cover indicates that moisture is formed on the specific region of the window cover, the controller performs heating only the specific region of the window cover to a value equal to or greater than a third setting value using a far-infrared light source.

* * * * *